United States Patent [19]
White

[11] Patent Number: 5,310,797
[45] Date of Patent: * May 10, 1994

[54] CONTAINER CLOSURES AND PROCESSES OF MAKING THEM

[75] Inventor: Steven A. C. White, Ivinghoe, Nr. Leighton Buzzard, England

[73] Assignee: W. R. Grace & Co.-Conn., New York, N.Y.

[ * ] Notice: The portion of the term of this patent subsequent to May 18, 2010 has been disclaimed.

[21] Appl. No.: 762,663

[22] Filed: Sep. 19, 1991

[30] Foreign Application Priority Data

Sep. 28, 1990 [GB] United Kingdom ............... 9021167

[51] Int. Cl.$^5$ .................. C08L 9/00; C08L 47/00; C08L 53/02
[52] U.S. Cl. ..................... 525/99; 525/315; 525/316; 426/397; 220/304; 215/363
[58] Field of Search ............ 525/99, 315, 316; 215/363; 426/397; 220/304

[56] References Cited

U.S. PATENT DOCUMENTS

| | | | |
|---|---|---|---|
| 3,705,122 | 12/1972 | Gwinner | 524/313 |
| 4,277,431 | 7/1981 | Peller | 264/148 |
| 4,518,336 | 5/1985 | Alieri | 425/110 |
| 4,833,206 | 5/1989 | Tajima | 525/187 |
| 5,211,974 | 5/1993 | White | 426/106 |

FOREIGN PATENT DOCUMENTS

| | | |
|---|---|---|
| 1112023 | 5/1968 | European Pat. Off. . |
| 0073334 | 3/1983 | European Pat. Off. . |
| 0083826 | 7/1983 | European Pat. Off. . |
| 0129309 | 12/1984 | European Pat. Off. . |
| 0174032 | 3/1986 | European Pat. Off. . |
| 0207385 | 1/1987 | European Pat. Off. . |
| 0250027 | 12/1987 | European Pat. Off. . |
| 0328337 | 8/1989 | European Pat. Off. . |
| 2349508 | 11/1977 | France . |
| 48-14708 | 5/1973 | Japan . |
| 1112024 | 5/1968 | United Kingdom . |
| 1112025 | 5/1968 | United Kingdom . |
| 2108943A | 5/1983 | United Kingdom . |
| 80/00014 | 8/1980 | World Int. Prop. O. . |

OTHER PUBLICATIONS

CA 112(18): 160731y, Apr. 30, 1990, Hofeldt et al.
CA 112(8): 57713v, Feb. 19, 1990, White.
CA 115(8): 73488t Aug. 26, 1991, Kvyk et al.
CA 102(12): 96678a, Mar. 25, 1985, Sekisui Chem. Co., Ltd.
CA 99(8): 55087h, Aug. 22, 1983, Mendelsohn et al.
CA 69(4): 11073b, May 1, 1968 Ceresa et al.
Derwent Publications Abstract, AN-73-269270 of Japanese Patent Application 48014708.

Primary Examiner—John Kight, III
Assistant Examiner—P. Hampton-Hightower
Attorney, Agent, or Firm—John Dana Hubbard; William L. Baker

[57] ABSTRACT

Bottle gaskets are provided from a thermoplastic composition comprising a homogeneous blend of butyl rubber with other thermoplastic polymer. The gaskets provide an effective seal at a moderate pressure but permit venting at a higher pressure. They can be made by inserting molten heated thermoplastic material into the bottle cap and moulding it in the cap and cooling it to form the gasket.

11 Claims, No Drawings

CONTAINER CLOSURES AND PROCESSES OF MAKING THEM

A wide variety of processes and compositions have been proposed for forming the gasket in container closures, for instance bottle caps. These include plastisols, solutions in organic solvents, aqueous dispersions (including aqueous latices) and mouldable thermoplastic compositions. They have all been proposed for a variety of container closure types.

The gasket must provide a good seal between the body and the cap so as to prevent inward migration of contaminants or unwanted outward escape of carbon dioxide when the bottle is to contain a carbonated beverage or beer. In order that the beverage does not acquire a flat taste and texture the seal must withstand moderate pressures, for instance up to about 5 and often about 7 bar without venting. It might be thought that it would be desirable for there to be no sensible upper limit on the pressure that the gasket can withstand without venting. In practice however it is desirable for the gasket to vent at a pressure below a pressure at which the bottle will burst. This is because if a beverage bottle is left in an exposed place, for instance hot sunshine, high pressures can be generated spontaneously. It is desirable that the gasket should vent in preference to the bottle shattering. In practice this means that the gasket should vent before the pressure exceeds around 12 or 13 bar.

The ideal gasket for bottles containing beer or carbonated beverages would therefore prevent entry or escape of gases, and would give a good seal at a moderate internal pressure, typically up to about 5 bar, but would vent at a higher pressure that is below the burst pressure of the bottle, and that is typically in the range 5 to 12 or 13 bar.

The steps of lining the gasket into the cap and of subsequently filling and closing the beer bottles are all conducted at very high speed and so it is necessary that the gasket material should be capable of being used in these high speed processes and that it should give uniform results. For instance it is not satisfactory to use a composition that gives a venting pressure of, for instance, 12 bar in some bottles if it is liable to give venting pressures as low as 9 bar or as high as 15 bar in other bottles since a significant number of the bottles would still be liable to burst and this is unacceptable.

A wide variety of processes and compositions have been proposed for forming the gasket in various container closures, for instance bottle caps. These include plastisols, solutions in organic solvents, aqueous dispersions (including aqueous latices) and mouldable thermoplastic compositions. An early disclosure of the use of thermoplastic compositions for forming container closures is in GB 1,112,023 and 1,112,025. They describe a wide variety of ways of introducing the compositions into the cap and a wide variety of thermoplastic compositions that can be used.

The closures in GB 1,112,023 were according to Example 1, tested for sealing properties at 3 volume and 5 volume carbonation with storage for 38° C. at 1 month. These tests are conducted at, respectively, 4.3 bar and 7.9 bar and so merely showed that these closures maintained an internal pressure of up to 7.9 bar for one month.

Methods that are described in these two patents include inserting and bonding a preformed uniform disc into the cap, inserting and bonding a preformed contoured disc into the cap, flowing a composition into the cap while rotating it and optionally moulding it, flowing a composition into the cap and moulding it while the composition is still hot, inserting a disc of composition carried on a metal plate, transferring composition by a moulding dye and moulding it into the cap, compression moulding the composition into the cap, and so on. In all the examples, the composition was formed into a sheet, discs were cut from it and the discs were then inserted into the caps and cold moulded into the caps. In many of the examples the inserted disc had a diameter substantially the same as the diameter of the cap.

Thermoplastic compositions that were described include blends of ethylene vinyl acetate (EVA) and micro crystalline wax, EVA and low density polyethylene (LDPE) having a melt flow index (MFI) of 7, similar blends containing also butyl rubber having Mooney viscosity of 70, a blend of equal amounts of LDPE having MFI 7 with butyl rubber having Mooney 70, blends of different types of EVA, a blend of LDPE with polyisobutylene, a blend of EVA with ethylene propylene copolymer, an ethylene acrylic acid ester copolymer, a blend of this with LDPE, a blend of LDPE with ethylene propylene copolymer, and a blend of LDPE with chloro sulphonated polyethylene.

Various disclosures of forming gaskets from thermoplastic compositions have appeared from time to time since then and these have listed a wide variety of polymers that can be used. Generally, most of the polymers named above have been listed. An example is EP 331,485 in which molten material is positioned in the cap while still molten (or semi molten) and is moulded into the cap.

In practice, the thermoplastic compositions that have been proposed and used most widely as gaskets for containers are compositions of polyethylenes, ethylene vinyl acetate polymers, and blends thereof. None of the others have attracted any great commercial interest, presumably because of perceived difficulties in making or using the compositions or in their performance.

An alternative material that has been used very widely is polyvinyl chloride, generally applied as a plastisol, and one advantage of this is that it gives good impermeability to odours and gives good sealing properties, as discussed below. However there is now a desire to avoid the use of polyvinyl chloride in gaskets for containers for consumable materials and so it would be desirable to be able to achieve sealing properties similar to polyvinyl chloride but without its use.

PVC-free sealing compositions for bottle gaskets were described by DS-Chemie in EP-A-0250027.

In Die Brauwelt, 3, 1991, pages 47 and 48 it is stated "PVC compounds for crown closures are under attack, not only because of their PVC content, but also because of the platicisers, which are the other main component of the (compound) formula. According to a communication from DS-Chemie, Bremen, PVC-free technology, amongst other, is based on the following raw materials: polyethylene, polypropylene, EVA, various rubber types such as SBS, SIS, butyl-rubber. Depending on the combination of these varous raw materials the properties, essential for the beverage industries, can be obtained".

This article mentioned certain effects such as reduced pressure-holding, oxygen barrier, and chloroanisole barrier effects. No actual compositions are described in the article (which was published after the priority date of this application). The polymers listed in this article are typical of those previously listed for possible use in PVC-free closures and so this article merely outlines the problems and does not offer any solution to these problems.

As indicated, polyethylene and ethylene vinyl acetate copolymers are the materials that have been used most widely for non-PVC gaskets and these and other thermoplastic blends that have been used commercially do not meet the required objectives of a uniform and moderate venting pressure, even though they may give perfectly satisfactory sealing at low pressures for prolonged periods (as described in GB 1,112,025).

Several of the materials described in the literature are rather inconvenient to use in practice, for instance because of difficulties of blending or moulding, and this is one reason why commercial effort has been concentrated primarily on polyethylene and ethylene vinyl acetate.

We have now found that it is possible to select materials from those that have previously been disclosed and to apply these in a convenient .manner, and thereby obtain a gasket that does give a good seal at low pressures but that has a moderate and uniform venting pressure Although adequate results can be obtained with a composition specifically described in the literature for preforming into a sheet and cutting into discs (Example 7 of GB 1,112,025) the invention includes particularly preferred compositions that differ from this and that give greatly improved results. Also the preparation of preformed disc is unsatisfactory and does not give the desired results.

A method according to the invention of forming in a bottle cap a gasket that provides an effective seal at a moderate pressure but that vents at a higher pressure comprises inserting heated molten thermoplastic material into the cap and moulding it in the cap and cooling it to form the gasket, and in this method the thermoplastic material is a homogeneous blend of 20 to 60% by weight butyl rubber with 40 to 80% by weight other thermoplastic polymers.

The invention also includes the use of a thermoplastic composition for forming a bottle cap gasket that provides a seal at a moderate pressure but that vents at a higher pressure, wherein the thermoplastic composition is a homogeneous blend of 20 to 60% by weight butyl rubber with 40 to 80% by weight other thermoplastic polymers.

The invention also includes bottle caps containing such gaskets and bottles sealed with such caps. The caps are preferably crown closures but can be roll-on or screw-on closures. They are preferably metal, but can be plastic.

The invention is of particular value for glass bottles that are to be pasteurised.

The bottle may be intended to contain, or may be a closed bottle that does contain, any pressurised potable product, preferably a beverage such as a carbonated beverage or beer.

By the invention it is possible to provide an effective seal at a moderate pressure, that is usually below 7 bar and preferably below 5 bar, but that will vent at a higher pressure, which is usually in the range 5 to 12 bar, preferably 7 to 12 bar.

The amount of butyl rubber is generally at least about 30% but is usually not more than about 50% or 55% by weight of the blend. The butyl rubber is a copolymer of isoprene and butylene. Although both low and high molecular weight butyl rubbers can be used, best results are obtained with low molecular weight rubbers, for instance rubbers having a Mooney (ML1+8 at 110° C.) of below 50, and generally below 47, for instance in the range about 43 to 47 or lower.

The other thermoplastic polymers in the blend must be selected such that they can be homogeneously blended with the butyl rubber to form a homogeneous melt which can be extruded and moulded into the cap in a convenient manner to form an adherent gasket having the desired properties. The thermoplastic polymers conventionally mentioned in the literature for thermoplastic gaskets can be used for this purpose and, provided they are blended with butyl rubber in the desired proportions it is relatively easy to select blends that give the surprising combination of moderate but relatively uniform venting pressure.

Preferred thermoplastic materials are polyethylene, polypropylene, thermoplastic rubbers, ethylene propylene copolymers, acid modified ethylene propylene copolymers, styrene butadiene rubber, carboxylated styrene butadiene, polyisoprene, styrene isoprene styrene block copolymers, styrene butadiene styrene block copolymers, styrene, ethylene butylene styrene block copolymers, polystyrene, ethylene vinyl acetate copolymers, ethylene (meth) acrylate copolymers and ethylene vinyl alcohol copolymers.

Particularly preferred materials comprise polyethylenes. High density polyethylene gives good results, especially when it has melt film index in the range about 5 to 15. Low density polyethylene can also be satisfactory and although LDPE's having MFI below 10 can be used, it is generally preferred to use LDPE having higher MFI, for instance above 12 and generally above 15, for instance up to around 25.

Blends of butyl with a mixture of 1 part styrene butadiene styrene block copolymer with 3 to 8 parts, often around 5 or 6 parts, polyethylene, generally LDPE, can give particularly good results, especially when the LDPE is a relatively low MFI polymer, typically in the range MFI 5 to 10.

Good results can also be obtained with ethylene propylene rubbers, especially when blended with a mineral oil, generally in the ratio of 1 part oil to 1.5 to 4, often around 2 to 3, parts by weight ethylene propylene rubber.

It is preferred to form a molten mix of the butyl rubber and the thermoplastic polymer or polymers, for instance by melting a preformed mix in a melt, extruder and to extrude the mix continuously and to transfer the desired pieces of molten mix direct from the point of extrusion to the individual caps. Processes of this general type are known as the HC (trade mark) cap, the Sacmi (trade mark) and the Zapata (trade mark) processes. Such processes are described in, for instance, U.S. Pat. No. 4,277,431, EP 73334, U.S. Pat. No. 3,705,122 and 4,518,336, and EP 207,385. It is particularly preferred to conduct the process as described in EP 331,485.

The dimensions of each cap will be selected according to the dimensions of the bottle and these dimensions, and the amount of thermoplastic composition deposited in each cap, will be conventional.

EXAMPLE 1

As examples of the invention, blends of the thermoplastic compositions set out below were formed from the respective polymer pellets by melt mixing, and the melt was then inserted into a plurality of bottle crown caps and moulded into annular gaskets, using a commercial lining machine (Sacmi Plasmatic - trade mark).

The lined crowns were closed on to glass bottles containing carbonated water having a carbonation level of 2.7 volumes giving a pressure of 2.2 bar at room temperature.

After a storage time of 24 hours at room temperature, the venting pressures were measured using an Owens-Illinois Secure Seal tester and the venting pressure for a range of crown closures was observed and the maximum, minimum and mean values were recorded. The results are as follows in which polymer proportions are in parts by weight and pressures (mean, maximum and minimum) are in bars.

The polymers are the following.
LDPE1 Low density polyethylene MFI 7, density 0.918
LDPE2 Low density polyethylene MFI 20, density 0.918
HDPE High density polyethylene MFI 20, density 0.950
Butyl 1 Low m.wt. isoprene/butylene copolymer Mooney (ML1+8 at 125°C.) 45–47
Butyl 2 High m.wt. isoprene/butylene copolymer Mooney (ML1+8 at 125°C.) 46–56
SBS Sytrene butadiene styrene block copolymer Shell Cardiflex TR1102s
EPM Ethylene-propylene rubber TOTAL EP038
OIL Mineral Oil

TABLE 1

| LDPE 1 | 100 | 90 | 80 | — | 70 | — | 50 | — |
|---|---|---|---|---|---|---|---|---|
| HDPE | — | — | — | 80 | — | 70 | — | 50 |
| Butyl 1 | — | 10 | 20 | 20 | 30 | 30 | 50 | 50 |
| Mean | 13+ | 12.9 | 10.7 | 12.8 | 11.1 | 10.7 | 9.8 | 8.9 |
| Max | 13+ | 13+ | 13+ | 13+ | 13+ | 13+ | 11.5 | 9.5 |
| Min | 13+ | 115 | 8.5 | 12.0 | 8.5 | 9.5 | 7.5 | 7.0 |

These results indicated that 50% butyl is required to get the maximum mounting pressure below 13 bar. At this level HDPE is better than LDPE.

TABLE 2

| LDPE 1 | 50 | — |
|---|---|---|
| LDPE 2 | — | 50 |
| Butyl 1 | 50 | 50 |
| Mean | 20.8 | 9.7 |
| Max | 12.5 | 11.5 |
| Min | 9.0 | 7.0 |

These results indicate that the lower molecular weight LDPE (higher MFI) is better.

TABLE 3

| LDPE 2 | 50 | — |
|---|---|---|
| Butyl 1 | 50 | 50 |
| Butyl 2 | — | 50 |
| Mean | 9.7 | 10.9 |
| Max | 11.5 | 13+ |
| Min | 7.0 | 9.0 |

These results indicated that the lower molecular weight butyl give the better performance.

TABLE 4

| LDPE 1 | 85 | 42.5 |
|---|---|---|
| SBS | 15 | 7.5 |
| Butyl 1 | — | 50 |
| Mean | 12.8 | 8.3 |
| Max | 13.0 | 10.5 |
| Min | 12.0 | 7.0 |

TABLE 5

| EPM | 70 | 35 |
|---|---|---|
| Oil | 30 | 15 |
| Butyl 1 | — | 50 |
| Mean | 13+ | 11.7 |
| Max | 13+ | 13+ |
| Min | 13+ | 4.5 |

EXAMPLE 2

The final composition in Table 1 (50 HDPE, 50 Butyl 1) is used for lining 30 bottles of the size and with the filling shown in Example 1 on a commercial bottling machine. The mean, maximum and minimum values are 6.75, 8.05 and 5.60 bars.

While preferred embodiments of this invention have been described in detail hereinabove, it is to be understood that many changes and modification may be made by those skilled in the art without departing from the scope and spirit of this invention.

What is claimed:

1. A sealing gasket comprising a composition formed from a homogeneous blend of from about 20 to about 60% by weight of the blend butyl rubber and from about 40 to about 80% by weight of the blend of one or more thermoplastic polymers, wherein the composition when formed into a gasket in a container closure and applied to a container containing a pressurized potable product forms an effective seal at pressures below 7 bar but which vents at a pressure in a range of 7 to 12 bar.

2. The gasket of claim 1 wherein the amount of butyl rubber is from about 30 to about 50% by weight of the blend.

3. The gasket of claim 1 wherein the butyl rubber is a copolymer of isoprene and butylene and has Mooney viscosity (ML1+8 at 110° C.) of below 50.

4. The gasket of claim 1 wherein the one or more thermoplastic polymers are selected from the group consisting of polyethylene, polypropylene, thermoplastic rubbers, ethylene propylene copolymers, acid modified ethylene propylene copolymers, styrene butadiene rubber, carboxylated styrene butadiene, polyisoprene, styrene isoprene styrene block copolymers, styrene butadiene styrene block copolymers, styrene ethylene butylene styrene block copolymers, polystyrene, ethylene vinyl acetate copolymers, ethylene (meth) acrylate copolymers and ethylene vinyl alcohol copolymers.

5. The gasket of claim 1 wherein the thermoplastic polymer comprises polyethylene.

6. The gasket of claim 1 wherein the polyethylene is high density polyethylene having a melt film index of about 5 to about 15.

7. The gasket of claim 1 wherein the polyethylene is low density polyethylene having a melt film index of about 12 to about 25.

8. The gasket of claim 1 wherein the thermoplastic polymer is a mixture of 1 part styrene butadiene styrene block copolymer with 3 to 8 parts polyethylene.

9. The gasket of claim 1 wherein the gasket vents at a pressure less than the pressure at which the bottle shatters.

10. A sealing gasket comprising a composition formed from a homogeneous blend of from about 20 to about 60% by weight of the blend butyl rubber and from about 40 to about 80% by weight of the blend of one or more thermoplastic polymers selected from the group consisting of polyethylene, polypropylene, thermoplastic rubbers, ethylene propylene copolymers, acid modified ethylene propylene copolymers, stryrene butadiene rubber, carboxylated styrene butadiene, polyisoprene, styrene isoprene styrene block copolymers, styrene butadiene styrene block copolymers, styrene ethylene butylene styrene block copolymers, polystyrene, ethylene vinyl acetate copolymers, ethylene (meth) acrylate coplymers and ethylene vinyl alcohol copolymers wherein the composition when formed into a gasket in a container closure and applied to a container containing a pressurized potable product forms an effective seal at pressures below 7 bar but which vents at a pressure in a range of 7 to 12 bar.

11. In a container for pressurized products, having a body and a closure with a gasket for sealing the body of the container such that the gasket prevents inward migration of contaminants and unwanted outward escape of gas, the improvement comprising the gasket is formed of a composition formed from a homogeneous blend of from about 20 to about 60% by weight of the blend butyl rubber and from about 40 to about 80% by weight of the blend of one or more thermoplastic polymers, wherein the composition when formed into a gasket forms an effective seal at pressures below 7 bar but which vents at a pressure in a range of 7 to 12 bar.

* * * * *